United States Patent
Mosley et al.

(10) Patent No.: US 10,072,585 B2
(45) Date of Patent: Sep. 11, 2018

(54) GAS TURBINE ENGINE TURBINE IMPELLER PRESSURIZATION

(71) Applicant: UNITED TECHNOLOGIES CORPORATION, Hartford, CT (US)

(72) Inventors: John H. Mosley, Portland, CT (US); James P. Chrisikos, Vernon, CT (US); John J. O'Connor, South Windsor, CT (US); Charles C. Wu, Glastonbury, CT (US); David Glasspoole, St. Lambert (CA); Roger Gates, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 386 days.

(21) Appl. No.: 14/769,591

(22) PCT Filed: Mar. 10, 2014

(86) PCT No.: PCT/US2014/022477
§ 371 (c)(1),
(2) Date: Aug. 21, 2015

(87) PCT Pub. No.: WO2014/159200
PCT Pub. Date: Oct. 2, 2014

(65) Prior Publication Data
US 2016/0003166 A1    Jan. 7, 2016

Related U.S. Application Data

(60) Provisional application No. 61/782,862, filed on Mar. 14, 2013.

(51) Int. Cl.
F02C 9/18    (2006.01)
F01D 5/08    (2006.01)
F02C 7/18    (2006.01)

(52) U.S. Cl.
CPC ............. *F02C 9/18* (2013.01); *F01D 5/082* (2013.01); *F02C 7/18* (2013.01);
(Continued)

(58) Field of Classification Search
CPC ...... F02C 7/04; F02C 7/18; F02C 9/18; F01D 5/18; F01D 5/081; F01D 5/087;
(Continued)

(56) References Cited

U.S. PATENT DOCUMENTS 4,759,688 A    7/1988    Wright et al.
6,077,035 A    6/2000    Walters et al.
(Continued)

FOREIGN PATENT DOCUMENTS

GR    20100100340    1/2012
WO    9932761    7/1999

OTHER PUBLICATIONS

International Preliminary Report on Patentability for International Application No. PCT/US2014/022477 dated Sep. 24, 2015.
(Continued)

*Primary Examiner* — Mark Laurenzi
*Assistant Examiner* — Mickey France
(74) *Attorney, Agent, or Firm* — Carlson, Gaskey & Olds, P.C.

(57) ABSTRACT

A cooling system for a gas turbine engine turbine section includes a rotor supporting a blade having a cooling passage. A disc is secured relative to the rotor and it forms a cavity between the rotor and the disc. A bleed air source is in fluid communication with the cavity. An impeller is arranged in the cavity. The impeller is configured to increase a fluid pressure within the cavity to drive bleed air from the bleed air source and thereby provide a pressurized cooling fluid to the cooling passage.

11 Claims, 3 Drawing Sheets

(52) U.S. Cl.
CPC ..... *F05D 2220/3215* (2013.01); *Y02T 50/673* (2013.01); *Y02T 50/676* (2013.01)

(58) Field of Classification Search
CPC ........ F01D 5/088; F01D 5/3015; F01D 5/187; F01D 5/08; F01D 5/082; Y02T 50/673; Y02T 50/676; F05D 2220/3215
USPC .......................................................... 416/95
See application file for complete search history.

(56) References Cited

U.S. PATENT DOCUMENTS

| | | |
|---|---|---|
| 6,269,628 B1 | 8/2001 | Gates |
| 7,677,048 B1 | 3/2010 | Brostmeyer et al. |
| 7,997,057 B1 | 8/2011 | Harris et al. |
| 8,087,249 B2 | 1/2012 | Ottaviano et al. |
| 2005/0039334 A1 | 2/2005 | Roby |
| 2006/0104808 A1 | 5/2006 | Dailey et al. |
| 2007/0003407 A1 | 1/2007 | Turner et al. |
| 2009/0004012 A1 | 1/2009 | Caprario et al. |
| 2011/0123325 A1 | 5/2011 | Morris et al. |
| 2013/0115081 A1 | 5/2013 | Wu et al. |

OTHER PUBLICATIONS

International Search Report and Written Opinion for PCT Application No. PCT/US2014/022477, dated Jun. 26, 2014.
Extended European Search Report for European Application No. 14774334.8 dated Oct. 11, 2016.

GAS TURBINE ENGINE TURBINE IMPELLER PRESSURIZATION

BACKGROUND

This disclosure relates to a gas turbine engine, and more particularly to an impeller used in a high pressure turbine section to increase the pressure of a cooling fluid.

Gas turbine engines typically include a compressor section, a combustor section and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

Both the compressor and turbine sections may include alternating series of rotating blades and stationary vanes that extend into the core flow path of the gas turbine engine. For example, in the turbine section, turbine blades rotate and extract energy from the hot combustion gases that are communicated along the core flow path of the gas turbine engine. The turbine vanes, which generally do not rotate, guide the airflow and prepare it for the next set of blades.

Typically bleed air from a compressor stage is used to cool the turbine blades in the turbine section. The cooling fluid is routed to the turbine blades by a variety of structures and then fed to internal cooling passages in the blade through a space in a rotor slot within which the turbine blade's root is mounted. Sufficiently high pressures must be provided to ensure desired flow through the cooling passages to achieve desired cooling.

SUMMARY

In one exemplary embodiment, a cooling system for a gas turbine engine turbine section includes a rotor supporting a blade having a cooling passage. A disc is secured relative to the rotor and it forms a cavity between the rotor and the disc. A bleed air source is in fluid communication with the cavity. An impeller is arranged in the cavity. The impeller is configured to increase a fluid pressure within the cavity to drive bleed air from the bleed air source and thereby provide a pressurized cooling fluid to the cooling passage.

In a further embodiment of any of the above, the blade is in a last stage of a high pressure turbine section.

In a further embodiment of any of the above, the rotor and the disc are affixed to a spool for rotation therewith.

In a further embodiment of any of the above, the bleed air source is a stage of a high pressure compressor section.

In a further embodiment of any of the above, the high pressure compressor section includes an aft hub having an aft hub leak path. The aft hub leak path is in fluid communication with the cavity and is configured to provide aft hub fluid to the cavity.

In a further embodiment of any of the above, a tangential on board injector has a TOBI leak path. The TOBI leak path is in fluid communication with the cavity and is configured to provide a TOBI fluid to the cavity.

In a further embodiment of any of the above, the impeller is mounted on the disc.

In a further embodiment of any of the above, the impeller includes circumferentially spaced paddles integral with disc.

In a further embodiment of any of the above, the cooling system for a gas turbine engine turbine section includes the static structure. The disc includes a seal configured to seal relative to the static structure.

In one exemplary embodiment, a turbine stage for a gas turbine engine includes a rotor. A disc is secured relative to the rotor to provide a cavity there between. An impeller is arranged in the cavity.

In a further embodiment of any of the above, the impeller includes a set of first paddles and a set of second paddles. The first and second paddles are interleaved relative to one another. The first paddles are larger than the second paddles.

In a further embodiment of any of the above, a rotor supports turbine blades that have a cooling passage in fluid communication with the cavity. The disc includes a seal in engagement with turbine blades.

In a further embodiment of any of the above, the disc includes an annular flange that provides the seal. The annular flange extends in an axial direction and is spaced radially from the sets of the first and second paddles. The annular flange provides an annular channel radially between the annular flange and the sets of first and second paddles.

In another exemplary embodiment, a disc for a turbine stage includes a disc-shaped wall supporting paddles that extend from an inlet radially outward to an outlet. An annular flange extends axially from the wall to provide an annular channel arranged radially between the outlet and the annular wall.

In a further embodiment of any of the above, the paddles include a set of first paddles and a set of second paddles. The first and second paddles are interleaved relative to one another. The first paddles are larger than the second paddles.

In a further embodiment of any of the above, the annular flange includes a first seal.

In a further embodiment of any of the above, a second seal is supported by the wall on a side opposite the paddles.

BRIEF DESCRIPTION OF THE DRAWINGS

The disclosure can be further understood by reference to the following detailed description when considered in connection with the accompanying drawings wherein.

DETAILED DESCRIPTION

Figure 1:
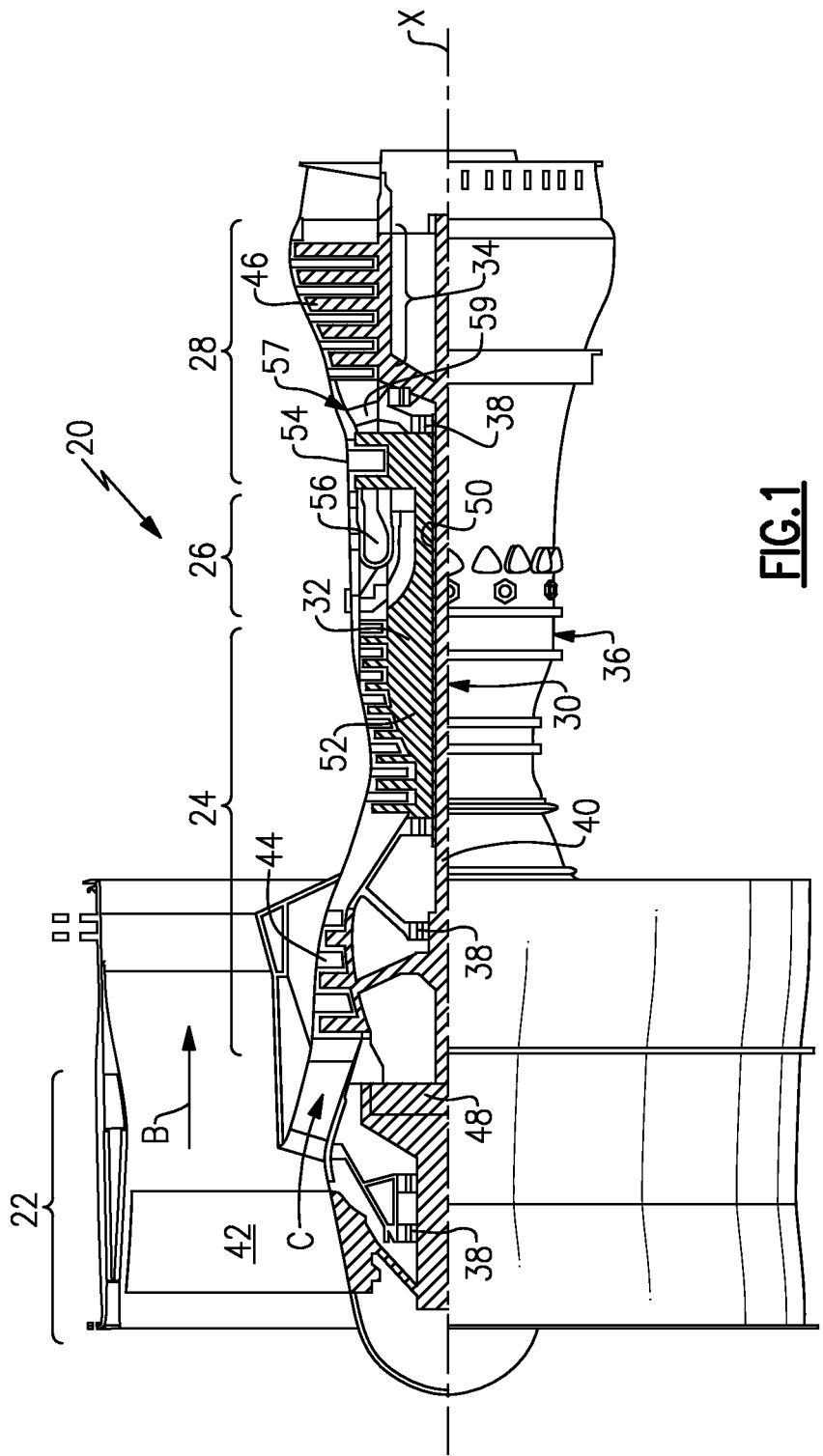
FIG. 1 schematically illustrates a gas turbine engine embodiment.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis X relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis X.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 57 of the engine static structure 36 is arranged generally between the high pressure turbine 54 and the low pressure turbine 46. The mid-turbine frame 57 further supports bearing systems 38 in the turbine section 28 as well as setting airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 57 includes vanes 59, which are in the core airflow path and function as an inlet guide vane for the low pressure turbine 46. Utilizing the vane 59 of the mid-turbine frame 57 as the inlet guide vane for low pressure turbine 46 decreases the length of the low pressure turbine 46 without increasing the axial length of the mid-turbine frame 57. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of [(Tram ° R)/518.7) 0.5]. The "Low corrected fan tip speed", as disclosed herein according to one non-limiting embodiment, is less than about 1150 ft/second.

Figure 2:
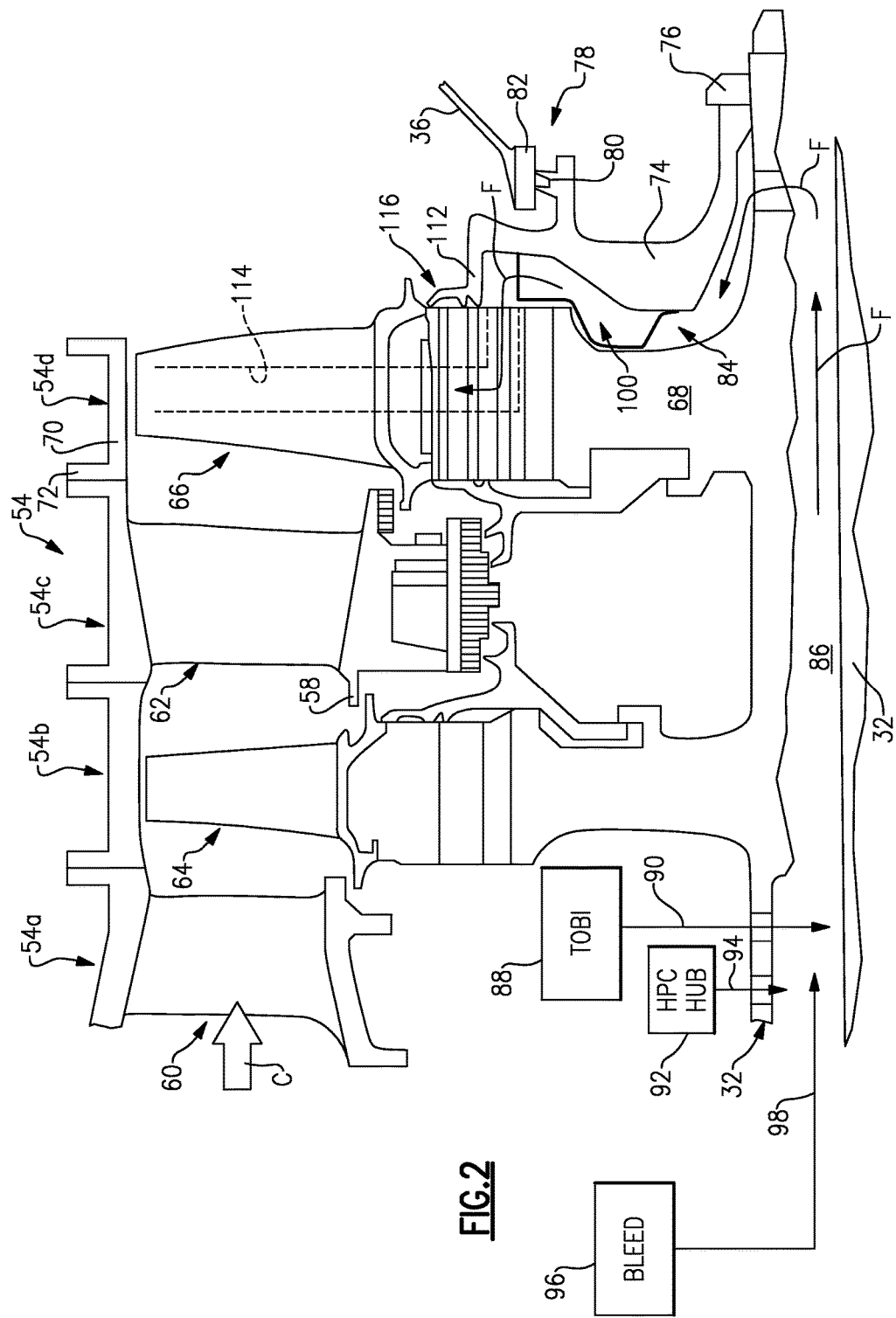
FIG. 2 is a cross-sectional view through a high pressure turbine section including an impeller.
Figure 3:
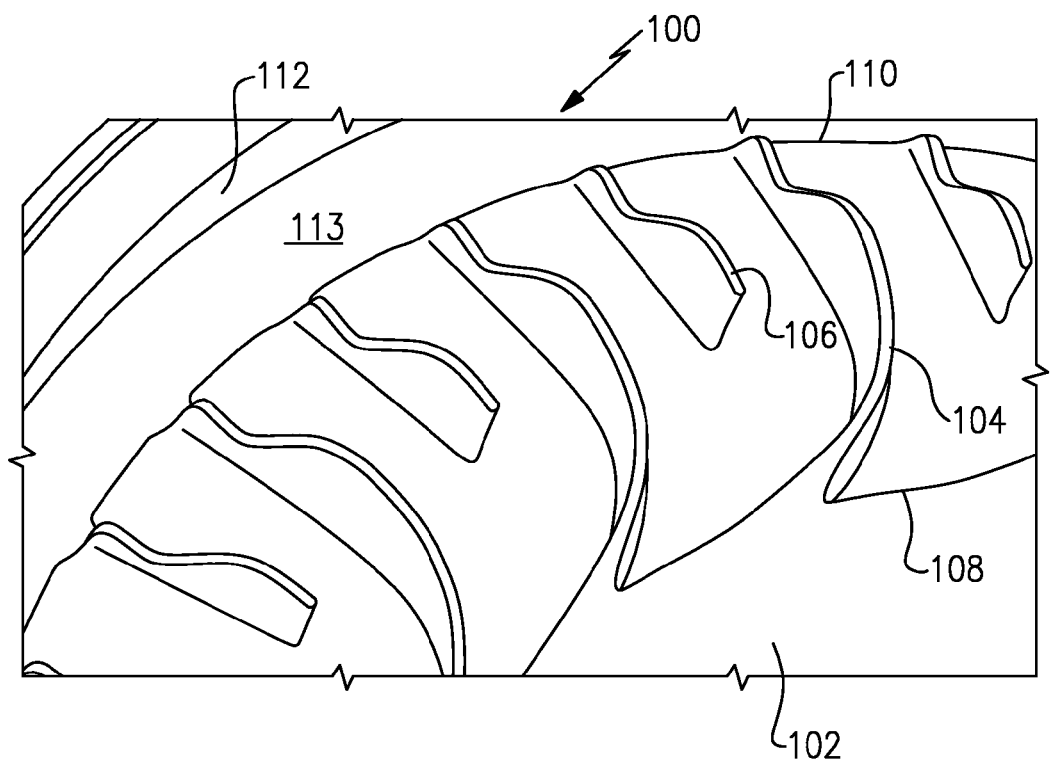
FIG. 3 is a partial perspective view of the impeller.

Referring to FIG. 2, a cross-sectional view through a high pressure turbine section 54 is illustrated. In the example high pressure turbine section 54, first and second arrays 54a, 54c of circumferentially spaced fixed vanes 60, 62 are axially spaced apart from one another. A first stage array 54b of circumferentially spaced turbine blades 64 is arranged axially between the first and second fixed vane arrays 54a, 54c. A second stage array 54d of circumferentially spaced turbine blades 66 is arranged aft of the second array 54c of fixed vanes 62. The last stage of blades 66 are mounted to a rotor 68. The blades 66 include a cooling passage 114.

The turbine blades each include a tip adjacent to a blade outer air seal 70 of a case structure 72. The first and second stage arrays 54a, 54c of turbine vanes and first and second stage arrays 54b, 54d of turbine blades are arranged within a core flow path C and are operatively connected to the shaft 32.

A disc 74 is secured relative to the rotor 68 at the aft of the high pressure turbine 54. In the example, a fixing device, such as a fastening element 76 secures the disc 74 for rotation with the shaft 32.

In one example, a seal assembly 78 is provided to seal the disc 74 relative to the static structure 36. The seal assembly 78 includes a seal 80, such as knife edge seals, to seal relative to a land 82 supported by the static structure 36.

A cavity 84 is provided between the disc 74 and rotor 68. Fluid F from a space 86 provided radially between the shaft 32 and rotor 68 is communicated to the cavity 84 for cooling the turbine blade 66. In one example, a tangential on-board injector (TOBI) 88 communicates a first fluid 90 to the space 86. Second fluid 94 from a high pressure compressor aft hub 92 is also provided to the space 86. The first and second fluids 90, 92 are fluid leaked past various seals through leak paths, and are insufficient to cool the turbine blade 66.

A bleed air source 96 provides a third fluid 98 that mixes with the first and second fluids 90, 94 in the space 86. The bleed air source 96 is typically the lowest pressure bleed air sufficient to deliver sufficient cooling fluid F to the turbine blade 66. In the example, the bleed air is provided by one of the latter stages in the high pressure compressor 52.

To enable a lower pressure bleed air source to be used, an impeller 100 is provided on the disc 74 within the cavity 84. The impeller 100 includes a wall 102 on which the first and second radially extending paddles 104, 106 are arranged. The first paddles 104 extend from an inlet 108 to an outlet 110. The first paddles 104 are larger than the second paddles 106, which are arranged circumferentially between the first paddles 104 in an interleaved relationship. The first and second paddles 104, 106 are shaped to fill the cavity 84 and provide an aerodynamic shape that increases the pressure of the fluid F. The impeller 100 increases the pressure of the fluid F and reduces the pressure loss of the fluid F as it reaches the cooling passage 114. In one example, the paddles are cast as a unitary structure with the wall 102.

An annular flange 112 extends axially forward from the wall 102 to provide an annular channel 113 between the outlet 110 and the annular flange 112. A seal 116 is provided on the annular flange 112 and engages the turbine blades 66. The fluid F is delivered from the annular channel 113 after its pressure has been increased relative to the pressure of the fluid within the space 86 and delivered to the cooling passage 114 within the turbine blade 66.

Although an example embodiment has been disclosed, a worker of ordinary skill in this art would recognize that certain modifications would come within the scope of the claims. For that reason, the following claims should be studied to determine their true scope and content.

What is claimed is:

1. A cooling system for a gas turbine engine turbine section, comprising:
   a rotor supporting a blade having a cooling passage;
   a disc secured relative to the rotor and forming a cavity between the rotor and the disc;
   a bleed air source in fluid communication with the cavity;
   an impeller is arranged in the cavity and configured to increase a fluid pressure within the cavity to drive bleed air from the bleed air source and thereby provide a pressurized cooling fluid to the cooling passage, wherein the bleed air source is a stage of a high pressure compressor section, the high pressure compressor section includes an aft hub having an aft hub leak path, the aft hub leak path in fluid communication with the cavity and configured to provide aft hub fluid to the cavity; and
   a tangential on board injector having a TOBI leak path, the TOBI leak path in fluid communication with the cavity and configured to provide a TOBI fluid to the cavity.

2. The cooling system according to claim 1, wherein the blade is in a last stage of a high pressure turbine section.

3. The cooling system according to claim 2, comprising a spool, the rotor and the disc affixed to the spool for rotation therewith.

4. The cooling system according to claim 1, wherein the impeller is mounted on the disc.

5. The cooling system according to claim 4, wherein the impeller includes circumferentially spaced paddles integral with disc.

6. The cooling system according to claim 1, comprising static structure, and the disc includes a seal configured to seal relative to the static structure.

7. The cooling system according to claim 1, wherein the impeller includes a set of first paddles and a set of second paddles, the first and second paddles interleaved relative to one another, the first paddles larger than the second paddles.

8. The cooling system according to claim 1, wherein rotor supports turbine blades having a cooling passage in fluid communication with the cavity, and the disc includes a seal in engagement with turbine blades.

9. The cooling system according to claim 8, wherein the disc includes an annular flange providing the seal, the annular flange extending in an axial direction and spaced radially from the sets of first and second paddles to provide an annular channel radially between the annular flange and the sets of first and second paddles.

10. The cooling system according to claim 7, wherein a disc-shaped wall supports the set of first and second paddles that extend from an inlet radially outward to an outlet, an annular flange extending axially from the wall to provide an annular channel arranged radially between the outlet and the annular flange.

11. The disc according to claim 10, comprising a second seal supported by the wall on a side opposite the paddles.

* * * * *